(12) United States Patent
Kim et al.

(10) Patent No.: US 10,923,935 B2
(45) Date of Patent: Feb. 16, 2021

(54) CHARGING APPARATUS, A VEHICLE INCLUDING SAME, AND A METHOD FOR CONTROLLING A CHARGING APPARATUS

(71) Applicants: HYUNDAI MOTOR COMPANY, Seoul (KR); KIA MOTORS CORPORATION, Seoul (KR)

(72) Inventors: Hanshik Kim, Seoul (KR); Geonhyeong Kim, Seoul (KR); Daejoon Surh, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 253 days.

(21) Appl. No.: 15/834,925

(22) Filed: Dec. 7, 2017

(65) Prior Publication Data
US 2019/0081485 A1 Mar. 14, 2019

(30) Foreign Application Priority Data
Sep. 13, 2017 (KR) .................. 10-2017-0116922

(51) Int. Cl.
*H02J 7/00* (2006.01)
*B60L 1/00* (2006.01)
(Continued)

(52) U.S. Cl.
CPC .......... *H02J 7/007* (2013.01); *B60L 1/00* (2013.01); *B60L 58/12* (2019.02); *H02J 7/008* (2013.01); *H02J 7/0071* (2020.01); *H02J 7/342* (2020.01)

(58) Field of Classification Search
USPC ............................... 320/107, 112, 114
See application file for complete search history.

(56) References Cited

U.S. PATENT DOCUMENTS 9,685,810 B1* 6/2017 Bhardwaj ............. H02J 7/0093
9,727,067 B2 8/2017 Fujiwara et al.
(Continued)

FOREIGN PATENT DOCUMENTS

CN 205583719 9/2016
JP 2015137616 7/2015
(Continued)

OTHER PUBLICATIONS

Joosting, Qualcomm Quick Charger 2.0 Smartphone Charger Reference Design, Oct. 21, 2013 (Year: 2013).*

*Primary Examiner* — Samuel Berhanu
(74) *Attorney, Agent, or Firm* — Lempia Summerfield Katz LLC (57) ABSTRACT

A charging apparatus is disclosed that charges a smartphone in a high-speed charging mode or in a general charging mode in consideration of a voltage state of a vehicle battery, or does not charge the smartphone, such that the charging apparatus effectively copes with unexpected situations capable of occurring in the vehicle. Therefore, when a voltage of a battery embedded in the vehicle reaches a constant voltage, the charging apparatus charges the smartphone in a manner that the in-vehicle battery voltage is protected, and no problem occurs in the vehicle when the vehicle starts engine ignition in the future. As a result, the charging apparatus efficiently charges the battery of the smartphone by adjusting the current and the voltage according to a voltage drop situation during a high-speed charging mode or a general charging mode, thereby efficiently charging the smartphone battery without causing overload to the battery.

13 Claims, 3 Drawing Sheets

(51) Int. Cl.
*B60L 58/12* (2019.01)
*H02J 7/34* (2006.01)

(56) References Cited

U.S. PATENT DOCUMENTS

| | | | | |
|---|---|---|---|---|
| 2008/0297116 | A1* | 12/2008 | Odaohhara | H01M 2/34 |
| | | | | 320/137 |
| 2012/0056581 | A1* | 3/2012 | Kim | B60L 1/006 |
| | | | | 320/109 |
| 2015/0326047 | A1* | 11/2015 | Chung | H02J 7/0052 |
| | | | | 320/162 |
| 2016/0054749 | A1 | 2/2016 | Fujiwara et al. | |
| 2017/0047852 | A1* | 2/2017 | Huang | H02J 7/00 |

FOREIGN PATENT DOCUMENTS

| | | |
|---|---|---|
| JP | 2016045760 | 4/2016 |
| JP | 2016086485 | 5/2016 |
| KR | 1020130098515 | 9/2013 |
| KR | 101609719 | 4/2016 |
| WO | 2015111459 | 7/2015 |

\* cited by examiner

CHARGING APPARATUS, A VEHICLE INCLUDING SAME, AND A METHOD FOR CONTROLLING A CHARGING APPARATUS

CROSS-REFERENCE TO RELATED APPLICATION

This application claims priority to and the benefit of Korean Patent Application No. 10-2017-0116922, filed on Sep. 13, 2017 in the Korean Intellectual Property Office, the disclosure of which is incorporated herein by reference in its entirety.

BACKGROUND

1. Field

Embodiments of the present disclosure relate to a charging apparatus, a vehicle including the same, and a method for controlling the charging apparatus.

2. Description of the Related Art

With the increasing demand of users or consumers who use various terminals, (e.g., a smartphone, a navigation, a black box, a hi-pass, etc.), for use in vehicles, a vehicle-purposed Universal Serial Bus (USB) capable of charging various kinds of terminals using a power source of each vehicle has recently been developed.

A conventional vehicle USB charging apparatus has been designed to limit the range of voltage to 5 volts (V) or less as well as to limit the range of current to 2 milliamps (mA) or less, and has also been designed to limit the range of power to 7.5 watts (W) or less. As a result, the conventional vehicle USB charging apparatus unavoidably takes a long period of time to perform battery charging due to a low charging speed, and the amount of charges stored in the battery is gradually reduced when a user continuously uses his or her terminal (e.g., a smartphone) during the battery charging.

However, Qualcomm Quick Charger 2.0 (hereinafter referred to as 'QC 2.0') has been designed to charge a battery of a smartphone at a higher charging speed. According to various connector shapes, Micro USB has been designed to charge a battery with a maximum power of 24 W, and C-type connector has been designed to charge a battery with a maximum power of 36 W, such that Micro USBs and C-type connectors have been designed to protect a battery charging cycle irrespective of various charging connector shapes, as well as to perform current/voltage limitations and temperature protection. As described above, QC 2.0 may provide smartphone users with rapid, efficient, and improved charging technologies.

Nowadays, improved technology for allowing each smartphone to be charged at a higher charging speed according to QC 2.0 has recently been applied to some kinds of smartphones in a manner that the smartphones can be charged at a higher speed in a high-speed charging mode (e.g., having 1.67 mA and 9 V) as compared to a standard, conventional, or general charging mode (e.g., having 2 mA and 5 V).

SUMMARY

Therefore, it is an aspect of the present disclosure to provide a charging apparatus, a vehicle including the same, and a method for controlling the charging apparatus, which efficiently charge a smartphone in consideration of a voltage state of a vehicle battery when the smartphone is charged using a high-speed USB charger based on QC 2.0.

Additional aspects of the disclosure will be set forth in part in the description which follows.

In accordance with an aspect of the present disclosure, a charging apparatus for charging a terminal using a battery for a vehicle includes: a controller configured to check a voltage state of the vehicle battery, and determine whether or not the vehicle battery is capable of being charged; and a charging portion configured to charge the terminal in a high-speed charging mode or in a general charging mode when the battery voltage checked by the controller is equal to or higher than a predetermined voltage.

The controller may determine whether the terminal is capable of being charged at high speed such that the terminal is charged in the general charging mode or in the general charging mode according to a charging specification of the terminal.

When the terminal is capable of being charged at high speed, the charging portion may provide the terminal with a voltage and current needed for the high-speed charging mode such that the terminal is charged at high speed.

When the voltage of the vehicle battery is less than a first reference voltage during the high-speed charging mode of the terminal, the controller may control the terminal to be charged in the general charging mode.

When the terminal is incapable of being charged at high speed, the charging portion may provide the terminal with a voltage and current needed for the general charging mode such that the terminal is charged in the general charging mode.

When the voltage of the vehicle battery is less than a second reference voltage during the general charging mode of the terminal, the controller may stop charging of the terminal.

The controller may count a charging stop time of the terminal, and when the counted charging stop time of the terminal is longer than a predetermined time, may check a voltage state of the vehicle battery and determines whether or not the terminal is capable of being charged.

The terminal may include a smartphone, a navigation, a black box, a hi-pass, etc.

The charging apparatus may be an in-vehicle high-speed USB charger based on Quick Charger 2.0.

In accordance with another aspect of the present disclosure, a charging apparatus includes: a controller configured to check a voltage state of a battery for a vehicle, and determine whether or not the vehicle battery is capable of being charged; and a charging portion configured to charge a terminal only when the battery voltage checked by the controller is equal to or higher than a predetermined voltage, wherein the controller checks a charging specification of the terminal and controls the terminal to be charged in a high-speed charging mode or in a general charging mode.

When the voltage of the vehicle battery is less than the predetermined voltage during charging of the terminal, the controller may change a charging mode of the terminal to another charging mode.

The charging mode may include a high-speed charging mode, a general charging mode, and a charging stop mode.

In accordance with another aspect of the present disclosure, a vehicle includes: a controller configured to check a voltage state of a vehicle battery, and determine whether or not the vehicle battery is capable of being charged; and a charging portion configured to charge a terminal only when the battery voltage checked by the controller is equal to or higher than a predetermined voltage, wherein the controller checks a charging specification of the terminal and controls the terminal to be charged in a high-speed charging mode or in a general charging mode.

In accordance with another aspect of the present disclosure, a method for controlling a charging apparatus when a terminal is charged using a battery for a vehicle includes: checking a voltage of the vehicle battery; when the checked voltage of the vehicle battery is equal to or higher than a predetermined voltage, checking a charging specification of the terminal, and determining whether or not the terminal is capable of being charged at high speed; when the terminal is capable of being charged at high speed, supplying a voltage and current needed for a high-speed charging mode to the terminal using a charging apparatus, and thus charging the terminal in the high-speed charging mode; and when the terminal is incapable of being charged at high speed, supplying a voltage and current needed for a general charging mode to the terminal using the charging apparatus, and thus charging the terminal in the general charging mode.

In accordance with another aspect of the present disclosure, a method for controlling a charging apparatus when a terminal connected to the charging apparatus is charged using a battery for a vehicle includes: checking a voltage of the vehicle battery; when the checked voltage of the vehicle battery is equal to or higher than a predetermined voltage, checking a charging specification of the terminal, and determining whether or not the terminal is capable of being charged at high speed; when the terminal is capable of being charged at high speed, supplying a voltage and current needed for a high-speed charging mode to the terminal using the charging apparatus, and thus charging the terminal in the high-speed charging mode; determining whether the voltage of the vehicle battery is less than a first reference voltage during the high-speed charging mode of the terminal; and when the voltage of the vehicle battery is less than the first reference voltage, supplying a voltage and current needed for a general charging mode to the terminal using the charging apparatus, and thus charging the terminal in the general charging mode.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

As used herein, the term "general charging mode" may refer to a standard or conventional charging mode, or a lower-speed charging mode than the high-speed charging mode described herein.

Figure 1:
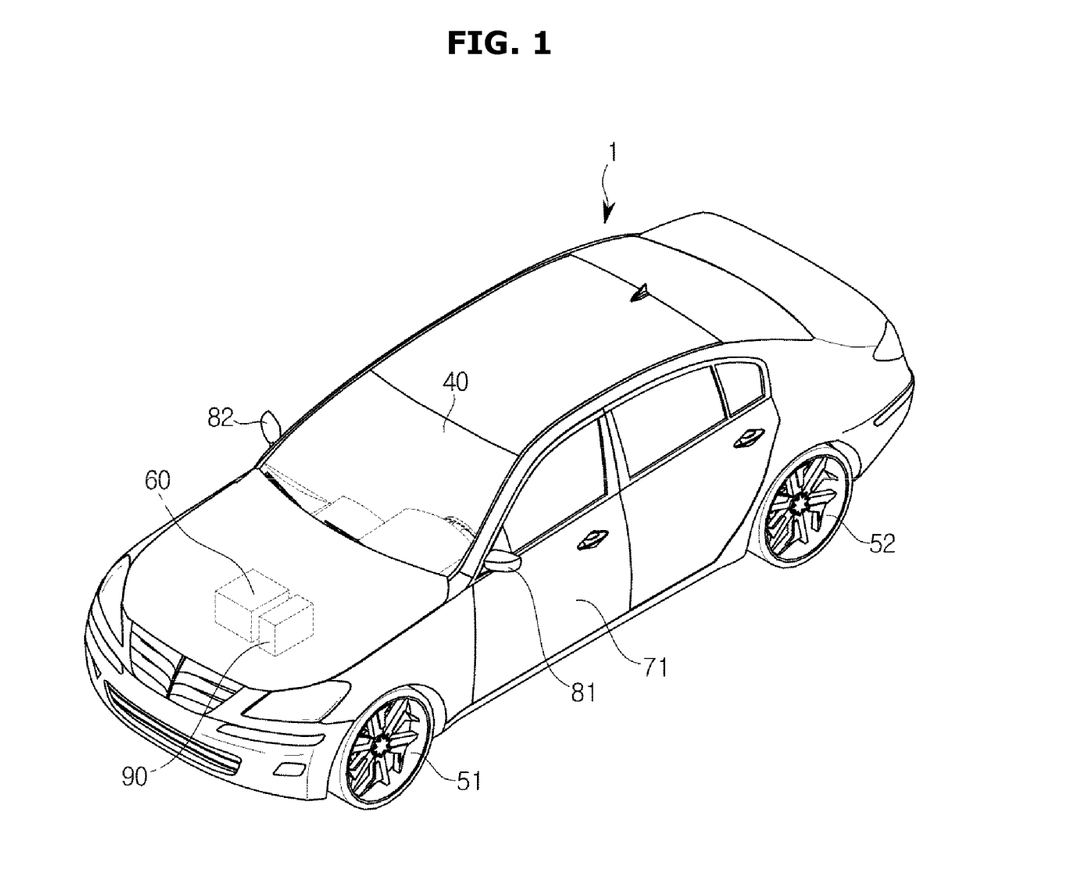
FIG. 1 is a view illustrating the appearance of a vehicle according to an embodiment of the present disclosure.

FIG. 1 is a view illustrating the appearance of a vehicle 1 according to an embodiment of the present disclosure.

Referring to FIG. 1, the vehicle 1 according to an embodiment of the present disclosure may include vehicle wheels 51 and 52 to move the vehicle 1 from place to place, a drive device 60 to rotate the vehicle wheels 51 and 52, doors 71 to shield an indoor space of the vehicle 1 from the outside, a vehicle windshield 40 to provide a forward view of the vehicle 1 to a vehicle driver who rides in the vehicle 1, and side-view mirrors 81 and 82 to provide a rear view of the vehicle 1 to the vehicle driver.

The windshield 40 is provided at a front upper portion of the vehicle 1 so that the vehicle driver who rides in the vehicle 1 may obtain visual information of a forward direction of the vehicle 1. The windshield 40 may also be referred to as a windshield glass.

The wheels 51 and 52 may include front wheels 51 provided at the front of the vehicle 1 and rear wheels 52 provided at the rear of the vehicle 1. The drive device 60 may provide rotational force to the front wheels 51 or the rear wheels 52 in a manner that the vehicle 1 moves forward or backward. The drive device 60 may include an engine to generate rotational force by burning fossil fuels or a motor to generate rotational force upon receiving power from a condenser (not shown).

The side-view mirrors 81 and 82 may include a left side-view mirror 81 provided at the left of the vehicle 1 and a right side-view mirror 82 provided at the right of the vehicle 1, so that the driver who rides in the vehicle 1 may obtain visual information of the lateral and rear directions of the vehicle 1.

The vehicle 1 according to one embodiment of the present disclosure may include a battery 90 configured to provide the vehicle 1 with a power-supply voltage. The battery 90 may be an in-vehicle battery configured to provide a voltage of 12V, 24V or 48V.

The vehicle 1 according to one embodiment may be an electric vehicle (EV), a hybrid electric vehicle (HEV), or a fuel cell electric vehicle (FCEV).

Figure 2:
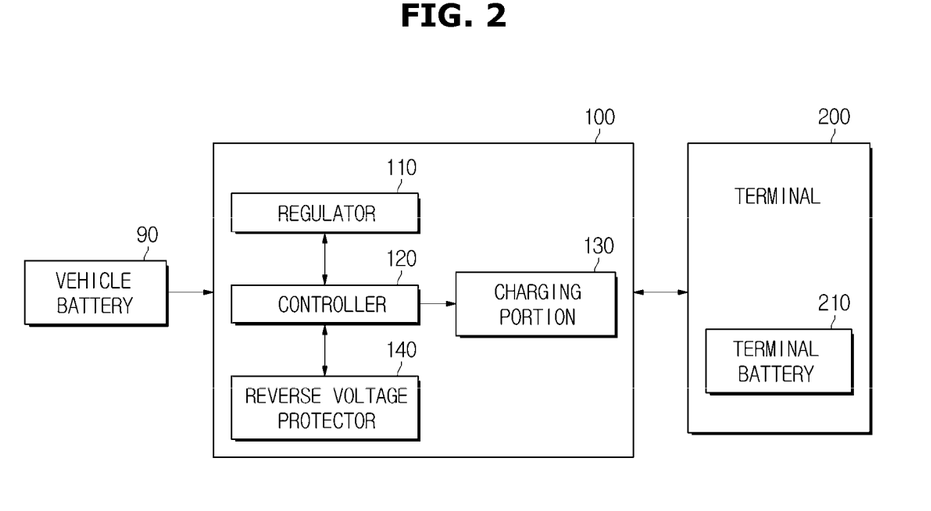
FIG. 2 is a block diagram illustrating a charging apparatus according to an embodiment of the present disclosure.

FIG. 2 is a block diagram illustrating a charging apparatus 100 according to an embodiment of the present disclosure.

Referring to FIG. 2, the charging apparatus 100 may be a USB charger configured to charge a terminal 200 upon receiving a power-supply voltage from an in-vehicle battery 90, and may be implemented as a QC 2.0 based high-speed USB charger capable of charging the terminal 200 in a high-speed charging mode or in a general charging mode.

The charging apparatus 100 may include a regulator 110, a controller 120, a charging portion 130, and a reverse voltage protector 140.

The regulator 110 may be connected to an in-vehicle battery 90, may receive a power-supply voltage from the in-vehicle battery 90, and may thus output a stabilized battery voltage.

In accordance with one embodiment, a switching-type regulator instead of a linear-type regulator 110 may be used. The reason why the switching-type regulator is used is as follows. When the linear-type regulator 110 is used, the accuracy of a logic circuit configured to trace a temperature of electrolyte of the in-vehicle battery 90 may be deteriorated due to an increasing temperature caused by heat emission of the regulator, such that the switching-type regulator is used instead of the linear-type regulator 110.

The controller 120 is a module for determining whether the charging apparatus 100 is able to perform charging by recognizing a state of the in-vehicle battery 90. The controller 120 may control the terminal 200 to enter a high-speed charging mode or a general charging mode in consideration of a voltage state of the in-vehicle battery 90, or may not perform charging of the terminal 200 in consideration of a voltage state of the in-vehicle battery 90.

In more detail, the controller 120 may control the terminal 200 to enter the high-speed charging mode or the general charging mode only when the in-vehicle battery 90 has a constant voltage or higher, such that the controller 120 may efficiently cope with unexpected in-vehicle situations (e.g., a voltage drop situation in which the in-vehicle battery 90 is gradually reduced in voltage using the air-conditioner or several convenience devices), and at the same time may efficiently charge the battery 200.

The controller 120 may confirm a charging specification of the terminal 200 to be charged, and may control the terminal 200 to enter a high-speed charging mode or a general charging mode. That is, the controller 120 may confirm the terminal 200 connected to the charging apparatus 100 and may determine which the charging specification is used for the terminal 200. If a new terminal 200 is developed and introduced to the market, the controller 120 may further include an update function capable of storing a protocol of the newly introduced terminal 200.

The controller 120 may measure a voltage, a current, and a temperature of the in-vehicle battery 90, and may thus confirm a State of Charge (SOC) of the in-vehicle battery 90, a State of Health (SOH) of the in-vehicle battery 90, and a State of Function (SOF) of the in-vehicle battery 90.

SOC may indicate a difference between a current in-vehicle battery 90 and a fully-charged battery, and SOH may indicate a difference between the current in-vehicle battery 90 and a new battery.

SOF may indicate how much performance of the in-vehicle battery 90 is matched with the actual requirement during the usage time of the in-vehicle battery 90, such that the SOF may be decided based on an SOC, an SOH, a battery operation temperature, and a charging/discharging history.

The controller 120 may store a timer configured to count an operation time starting from a vehicle startup time, and a residual capacity map table configured to initialize a State of Charge (SOC) according to an Open Circuit Voltage (OCV).

The controller 120 may use a Controller Area Network (CAN) of the vehicle 1. The CAN may refer to a network system to perform data communication between electronic control units (ECUs) as well as to control the ECUs. In more detail, the CAN may transmit data through a pair of twisted data lines or a pair of shield data lines shielded with a covering material. The CAN may operate according to multi-master principles in which each ECU for use in master/slave systems may operate as a master. Besides, the controller 120 may also perform data communication either through an in-vehicle wired network (for example, a Local Interconnect Network (LIN), Media Oriented System Transport (MOST), etc. of the vehicle 1) or through a wireless network such as a Bluetooth.

The controller 120 is a central processing unit (CPU) configured to process overall operations of the charging apparatus 100, and may control various modules, devices, etc. embedded in the charging apparatus 100. In accordance with one embodiment, the controller 120 may generate a control signal for controlling various modules and devices embedded in the charging apparatus 100, such that the controller 120 may control the operations of constituent elements using the control signal.

The controller 120 may include a memory to store programs for performing the aforementioned and following operations and various kinds of data associated with the programs, a processor to execute the programs stored in the memory, and a hydraulic control unit (HCU), a micro controller unit (MCU), etc., each of which acts as a hydraulic control device.

The controller 120 may be implemented as at least one of a flash memory type, a hard disk type, a multimedia card micro type, a card type memory (e.g., a Secure Digital (SD) memory or an eXtreme Digital (XD) memory), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disc, an optical disc, etc. However, the scope or spirit of the controller 120 according to the present disclosure is not limited thereto, and may also be implemented as another format well known to those skilled in the art.

When the voltage state of the in-vehicle battery 90 and the charging specification of the terminal 200 are confirmed by the controller 120, the charging apparatus 130 may provide the terminal 200 with a current while simultaneously maintaining the voltage of 9 V or 5 V so as to perform high-speed charging or general charging.

The reverse voltage protector 140 may include a diode for preventing a reverse voltage in a manner that a power-supply voltage from the in-vehicle battery 90 is supplied to the terminal 200.

The terminal 200 is an electronic device detachably coupled to the vehicle, for example, a smartphone, a navigation, a black box, a hi-pass, etc.

The terminal 200 may include various kinds of terminals capable of charging a terminal battery 210 using a power-supply voltage supplied to the vehicle.

The operations and effects of the charging apparatus, the vehicle including the same, and the method for controlling the charging apparatus according to one embodiment of the present disclosure will hereinafter be described with reference to the attached drawings.

Figure 3:
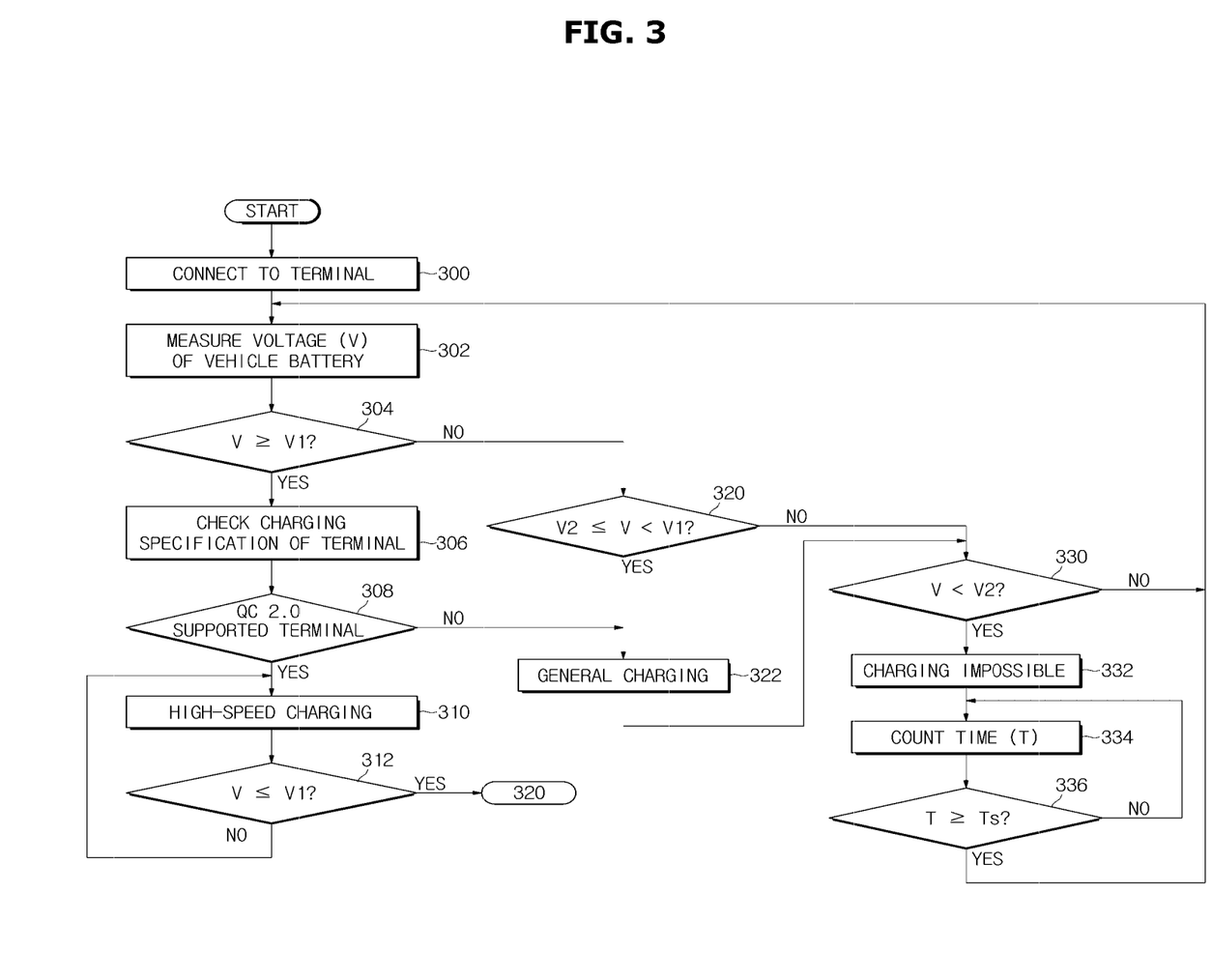
FIG. 3 is a flowchart illustrating a method for controlling a charging operation of the charging apparatus according to an embodiment of the present disclosure.

FIG. 3 is a flowchart illustrating a method for controlling a charging operation of the charging apparatus according to an embodiment of the present disclosure.

Referring to FIG. 3, the terminal 200 may be connected to the charging apparatus 100 after the vehicle starts ignition (300).

The controller 120 of the charging apparatus 100 may receive a power-supply voltage from the in-vehicle battery 90, and may confirm the voltage (V) of the in-vehicle battery 90 (302).

Therefore, the controller 120 may determine whether the voltage (V) of the in-vehicle battery 90 is equal to or higher than a first reference value V1 (e.g., 9 V at which the terminal can be charged at high speed) (304).

When the voltage (V) of the in-vehicle battery 90 is equal to or higher than the first reference voltage (V1) (304), the controller 120 may confirm the charging specification of the terminal 200 connected to the charging apparatus 100 (306).

Therefore, the controller 120 may check the charging specification of the terminal, and may thus determine whether the terminal 200 can be charged at high speed (e.g., QC 2.0 supported terminal) (308). As a result, only the terminal 200 capable of being charged at high speed (e.g., QC 2.0 supported terminal) may be charged at high speed by the charging apparatus 100.

When the terminal 200 is incapable of being charged at high speed (e.g., not identical to the QC 2.0 supported terminal) (308), the controller 120 may provide the terminal 200 with the charging current while simultaneously maintaining the charging voltage of 5 V in the charging apparatus 100 such that the terminal 200 may enter the general charging mode. The general charging mode of the terminal 200 may be carried out when the terminal 200 is incapable of being charged at high speed (e.g., not identical to QC 2.0 supported terminal) or needs to be charged by other charging devices.

When the terminal 200 is capable of being charged at high speed (e.g., QC 2.0 supported terminal) (308), the controller 120 may provide the terminal 200 with the charging current while simultaneously maintaining the charging voltage of 9 V in the charging apparatus 100 such that the terminal 200 can be charged at high speed. Therefore, the terminal 200 may receive the charging voltage of 9 V and the charging current from the charging apparatus 100, and may thus control the terminal battery 210 to be charged at high speed (310).

As described above, only when the in-vehicle battery 90 has the voltage of 9 V or higher and the terminal 200 is the QC 2.0 supported terminal capable of being charged at high speed, the charging apparatus 100 may charge the terminal 200 at high speed.

While the terminal 200 is charged at high speed, unexpected situations may occur in the vehicle at any time. For example, a situation in which an overvoltage is needed for the vehicle may occur in the vehicle. As a representative example of the overvoltage situation, a voltage drop situation in which the voltage of the in-vehicle battery is reduced by simultaneous use of the air-conditioner and several convenience devices may occur in the vehicle.

Therefore, the controller 120 may check the voltage (V) of the in-vehicle battery 90 during high-speed charging of the terminal 200, and may determine whether the voltage (V) of the in-vehicle battery 90 is less than the first reference voltage (V1) (312).

When the voltage (V) of the in-vehicle battery 90 is not less than the first reference voltage (V1) (312), the controller 120 may determine the absence of voltage drop during the high-speed charging of the terminal 200, may return to operation 310, and may then perform subsequent operations.

When the voltage (V) of the in-vehicle battery 90 is less than the first reference voltage (V1) (312), the controller 120 goes to operation 320 so as to control the terminal 20 to be charged in the general charging mode instead of the high-speed charging mode.

The controller 120 may determine whether the voltage (V) of the in-vehicle battery 90 is equal to or higher than a second reference voltage (V2) (e.g., 5 V at which the terminal 200 can be charged in the general charging mode), and is less than the first reference voltage (V1) (320).

When the voltage (V) of the in-vehicle battery 90 is equal to or higher than the second reference voltage (V2) and is less than the first reference voltage (V1), the controller 120 may provide the terminal 200 with the charging current while simultaneously maintaining the charging voltage of 5 V in the charging apparatus 100 so as to control the terminal 200 to be charged in the general charging mode. Therefore, the terminal 200 may receive the charging voltage of 5 V and the charging current from the charging apparatus 100, and may charge the terminal battery 210 in the general charging mode (322).

As described above, when the voltage (V) of the in-vehicle battery 90 is equal to or higher than 5 V or when the terminal 200 is incapable of being charged at high speed (e.g., not identical to the QC 2.0 supported terminal), the charging apparatus 100 may charge the terminal 200 in the general charging mode.

During the general charging mode of the terminal 200, unexpected situations may also occur in the vehicle at any time. For example, a situation in which an overvoltage is needed for the vehicle may occur in the vehicle. As a representative example of the overvoltage situation, a voltage drop situation in which the voltage of the in-vehicle battery is reduced by simultaneous use of the air-conditioner and several convenience devices may also occur in the vehicle.

Therefore, the controller 120 may check the voltage (V) of the in-vehicle battery 90 during the general charging mode of the terminal 200, and may determine whether the voltage (V) of the in-vehicle battery 90 is less than the second reference voltage (V2) (330).

When the voltage (V) of the in-vehicle battery 90 is not less than the second reference voltage (V2) (330), the controller 120 may determine the absence of voltage drop during the general charging mode of the terminal 200, may return to operation 302, and may then perform subsequent operations.

When the voltage (V) of the in-vehicle battery 90 is less than the second reference voltage (V2) (330), the controller 120 may determine the voltage (V) of the in-vehicle battery 90 reaches a voltage level corresponding to a charging impossible state such that the controller 120 may control the terminal 200 to be switched to a charging impossible state such that the charging apparatus 100 stops charging of the terminal 200 (332).

As described above, when the voltage (V) of the in-vehicle battery 90 is less than 5 V, the charging apparatus 100 does not charge the terminal 200 anymore.

After lapse of a predetermined time from the charging impossible state, the voltage (V) of the in-vehicle battery 90 may be switched to a voltage level corresponding to a charging possible state, such that the controller 120 may start counting of a time period (T) corresponding to the charging impossible state (334).

Therefore, the controller 120 may determine whether the counted time (T) is longer than a predetermined time (Ts) to be consumed until the in-vehicle battery is ready to provide a power-supply voltage requisite for battery charging (336).

When the counted time (T) is longer than the predetermined time (Ts) (336), the controller 120 may return to operation 302 to check the voltage (V) of the in-vehicle battery 90, and may then perform subsequent operations.

As is apparent from the above description, when a smartphone is charged using a QC 2.0 based USB charger capable of charging the smartphone at high speed, the charging apparatus, the vehicle including the same, and the method for controlling the charging apparatus according to the embodiment of the present disclosure may charge the smartphone in a high-speed charging mode or in a general charging mode in consideration of a voltage state of a vehicle battery, or may not charge the smartphone, such that the embodiment of the present disclosure may effectively cope with unexpected situations (e.g., a voltage drop caused by simultaneous use of an air-conditioner or several in-vehicle devices) capable of occurring in the vehicle. Therefore, when a voltage of a battery (e.g., an in-vehicle battery) embedded in the vehicle reaches a constant voltage, the embodiment of the present disclosure charges the smartphone in a manner that the in-vehicle battery voltage is protected, and no problem may occur in the vehicle when the vehicle starts engine ignition in the future. As a result, the embodiment may efficiently charge the battery of the smartphone by adjusting the current and the voltage according to a voltage drop situation during a high-speed charging mode or a general charging mode, thereby efficiently charging the smartphone battery without causing overload to the battery.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A charging apparatus for charging a terminal using a battery for a vehicle, the charging apparatus comprising:
   a controller configured to check a voltage state of the vehicle battery, and determine whether or not the vehicle battery is capable of being charged; and
   a charging portion configured to charge the terminal in a high-speed charging mode or in a general charging mode when the battery voltage checked by the controller is equal to or higher than a predetermined voltage,
   wherein the high speed charging mode provides a higher charging voltage to the terminal than the general charging mode,
   wherein the controller is configured to determine whether the terminal is capable of being charged at high speed such that the terminal is charged in the high-speed charging mode or in the general charging mode according to a charging specification of the terminal,
   wherein, when the terminal is incapable of being charged at high speed, the charging portion is configured to provide the terminal with a voltage and current needed for the general charging mode such that the terminal is charged in the general charging mode,
   wherein, when the voltage of the vehicle battery is less than a second reference voltage during the general charging mode of the terminal, the controller is configured to stop charging of the terminal,
   wherein the controller is configured to count a charging stop time of the terminal, and
   wherein, when the counted charging stop time of the terminal is longer than a predetermined time, the controller is configured to check a voltage state of the vehicle battery and determine whether or not the terminal is capable of being charged.

2. The charging apparatus according to claim 1, wherein, when the terminal is capable of being charged at high speed, the charging portion is configured to provide the terminal with a voltage and current needed for the high-speed charging mode such that the terminal is charged at high speed.

3. The charging apparatus according to claim 2, wherein, when the voltage of the vehicle battery is less than a first reference voltage during the high-speed charging mode of the terminal, the controller is configured to control the terminal to be charged in the general charging mode.

4. The charging apparatus according to claim 1, wherein the terminal comprises a smartphone, a navigation, a black box, a hi-pass, or a combination thereof.

5. The charging apparatus according to claim 1, wherein the charging apparatus is an in-vehicle high-speed universal serial bus (USB) charger based on a Quick Charger 2.0.

6. A charging apparatus comprising:
   a controller configured to check a voltage state of a battery for a vehicle, and determine whether or not the vehicle battery is capable of being charged; and
   a charging portion configured to charge a terminal only when the battery voltage checked by the controller is equal to or higher than a predetermined voltage,
   wherein the controller is configured to check a charging specification of the terminal and control the terminal to be charged in a high-speed charging mode or in a general charging mode,
   wherein the high speed charging mode provides a higher charging voltage to the terminal than the general charging mode,
   wherein the controller is configured to determine whether the terminal is capable of being charged at high speed such that the terminal is charged in the high-speed charging mode or in the general charging mode according to a charging specification of the terminal,
   wherein, when the terminal is incapable of being charged at high speed, the charging portion is configured to provide the terminal with a voltage and current needed for the general charging mode such that the terminal is charged in the general charging mode,
   wherein, when the voltage of the vehicle battery is less than a second reference voltage during the general charging mode of the terminal, the controller is configured to stop charging of the terminal,
   wherein the controller is configured to count a charging stop time of the terminal, and
   wherein, when the counted charging stop time of the terminal is longer than a predetermined time, the controller is configured to check a voltage state of the vehicle battery and determine whether or not the terminal is capable of being charged.

7. The charging apparatus according to claim 6, wherein, when the voltage of the vehicle battery is less than the predetermined voltage during charging of the terminal, the controller is configured to change a charging mode of the terminal to another charging mode.

8. The charging apparatus according to claim 7, wherein the charging mode comprises a high-speed charging mode, a general charging mode, and a charging stop mode.

9. A vehicle comprising:
   a controller configured to check a voltage state of a vehicle battery, and determine whether or not the vehicle battery is capable of being charged; and a charging portion configured to charge a terminal only when the battery voltage checked by the controller is equal to or higher than a predetermined voltage, wherein the controller is configured to check a charging specification of the terminal and control the terminal to be charged in a high-speed charging mode or in a general charging mode, wherein the high speed charging mode provides a higher charging voltage to the terminal than the general charging mode, wherein the controller is configured to determine whether the terminal is capable of being charged at high speed such that the terminal is charged in the high-speed charging mode or in the general charging mode according to a charging specification of the terminal, wherein, when the terminal is incapable of being charged at high speed, the charging portion is configured to provide the terminal with a voltage and current needed for the general charging mode such that the terminal is charged in the general charging mode, wherein, when the voltage of the vehicle battery is less than a second reference voltage during the general charging mode of the terminal, the controller is configured to stop charging of the terminal, wherein the controller is configured to count a charging stop time of the terminal, and wherein, when the counted charging stop time of the terminal is longer than a predetermined time, the controller is configured to check a voltage state of the vehicle battery and determine whether or not the terminal is capable of being charged.

10. A method for controlling a charging apparatus when a terminal is charged using a battery for a vehicle, the method comprising:

checking a voltage of the vehicle battery;

when the checked voltage of the vehicle battery is equal to or higher than a predetermined voltage, checking a charging specification of the terminal, and determining whether or not the terminal is capable of being charged at high speed;

when the terminal is capable of being charged at high speed, supplying a voltage and current needed for a high-speed charging mode to the terminal using a charging apparatus, and charging the terminal in the high-speed charging mode, wherein the high speed charging mode provides a higher charging voltage to the terminal than the general charging mode;

when the terminal is incapable of being charged at high speed, supplying a voltage and current needed for a general charging mode to the terminal using the charging apparatus, and charging the terminal in the general charging mode; and when the terminal is incapable of being charged at high speed, the charging portion is configured to provide the terminal with a voltage and current needed for the general charging mode such that the terminal is charged in the general charging mode;

the method further comprising:

when the voltage of the vehicle battery is less than a second reference voltage during the general charging mode of the terminal, stopping charging of the terminal;

counting a charging stop time of the terminal; and when the counted charging stop time of the terminal is longer than a predetermined time, checking a voltage state of the vehicle battery, and determining whether or not the terminal is capable of being charged.

11. The method according to claim 10, further comprising:

when the voltage of the vehicle battery is less than a first reference voltage during the high-speed charging mode of the terminal, controlling the terminal to be charged in the general charging mode.

12. The method according to claim 10, further comprising:

when the voltage of the vehicle battery is less than a reference voltage during the general charging mode of the terminal, stopping charging of the terminal.

13. A method for controlling a charging apparatus when a terminal connected to the charging apparatus is charged using a battery for a vehicle, the method comprising:

checking a voltage of the vehicle battery;

when the checked voltage of the vehicle battery is equal to or higher than a predetermined voltage, checking a charging specification of the terminal, and determining whether or not the terminal is capable of being charged at high speed;

when the terminal is capable of being charged at high speed, supplying a voltage and current needed for a high-speed charging mode to the terminal using the charging apparatus, and charging the terminal in the high-speed charging mode;

determining whether the voltage of the vehicle battery is less than a first reference voltage during the high-speed charging mode of the terminal; and when the voltage of the vehicle battery is less than the first reference voltage, supplying a voltage and current needed for a general charging mode to the terminal using the charging apparatus, and charging the terminal in the general charging mode, wherein the high speed charging mode provides a higher charging voltage to the terminal than the general charging mode, and wherein, when the terminal is incapable of being charged at high speed, the charging portion is configured to provide the terminal with a voltage and current needed for the general charging mode such that the terminal is charged in the general charging mode, the method further comprising:

when the voltage of the vehicle battery is less than a second reference voltage during the general charging mode of the terminal, stopping charging of the terminal;

counting a charging stop time of the terminal; and when the counted charging stop time of the terminal is longer than a predetermined time, checking a voltage state of the vehicle battery, and determining whether or not the terminal is capable of being charged.

* * * * *